United States Patent [19]

Herr et al.

[11] Patent Number: 4,479,195

[45] Date of Patent: Oct. 23, 1984

[54] DATA CONFERENCE SYSTEM

[75] Inventors: Diane E. Herr, Warrenville; Reinhard Metz, Oswego; Larry A. Russell, Bolingbrook, all of Ill.

[73] Assignee: AT&T Bell Laboratories, Murray Hill, N.J.

[21] Appl. No.: 415,254

[22] Filed: Sep. 7, 1982

[51] Int. Cl.³ ............................................. G06F 15/20
[52] U.S. Cl. ............................. 364/900; 179/18 BC; 178/3
[58] Field of Search ... 364/200 MS File, 900 MS File; 178/3; 179/18 BC

[56] References Cited

U.S. PATENT DOCUMENTS

4,027,098   5/1977   Reisch et al. ............................ 178/3
4,424,418   1/1984   Moore et al. ....................... 179/18 BC Primary Examiner—Raulfe B. Zache
Attorney, Agent, or Firm—C. H. Davis

[57] ABSTRACT

A communications network having a multiport data conference system is disclosed. The data conference system includes a multilevel processor arrangement with the lower level port processors communicating directly with data terminals and higher level processors controlling conference configuration. Data to be conferenced is put in a buffer memory which is shared by all levels of processors. The ports can be configured to be compatible with different type terminals that operate at different data speeds.

9 Claims, 10 Drawing Figures

FIG. 3 DATA BRIDGE PROCESSOR 200

FIG. 4
DATA LINK PROCESSOR 201

*FIG. 7*
MONITOR SEQUENCE

*FIG. 9*

FIG. 8
CONNECT SEQUENCE

FIG. 10

DATA CONFERENCE SYSTEM

TECHNICAL FIELD

This invention relates to communication systems and particularly to conferencing systems. In a more particular aspect, this invention relates to arrangements for conferencing the data facilities of a plurality of customers.

BACKGROUND OF THE INVENTION

Communication networks have become necessary adjuncts to conducting business on a national and global scale. The existing voice and data networks provide fast and convenient facilities for people and machines to communicate with each other over long distances without the inconvenience of traveling in order to conduct business. These networks are also more reliable and more economical than other forms of communication.

While these networks adequately provide facilities for point-to-point communication, it is desirable to enhance these networks by allowing three or more customers to participate in a conference call wherein many customers can exchange information by voice and other means. An example of this might be an audio/video conference involving several remotely located business associates, each having a video terminal. In addition to video terminals, some of the conferees might have graphics units, electronic chalkboards, data terminals, etc., all of which can be used for communicating information in different forms. For convenience, these and other modes of communication will be referred to herein by the generic term "data" communication, and it is not intended that they be limited only to those modes that are mentioned above.

While voice conferencing arrangements have generally been known in the prior art, data conferencing is relatively new and has inherent differences that must be treated in a special manner. For example, in audio conferencing, the voice samples of all conferees that are concurrently speaking are added together, and the sum is distributed to each conferee. Each conferee hears a composite signal of the voices of all other conferees.

While each conferee on a data conference also must receive messages from other conferees, the data messages cannot simply be added together since the resultant sum would be meaningless and not representative of any data message. Thus, a data conference arrangement must process large volumes of individual messages to and from each conferee.

Also, the various data conferees may each have a different kind of terminal so that transmission speeds between the conferees may be different. Furthermore, one conferee may be using a graphics terminal while another conferee may be using an electronic chalkboard, and these terminals may not be compatible for direct communication with each other in terms of signaling and the protocol of messages between the units.

The prior art data conferencing arrangements avoid the above problems by restricting conferencing only to terminals that are compatible and/or establishing the conference with the aid of an attendant who manually switches the conferees together so that at any given time, one data terminal would broadcast to all other terminals of the same type.

SUMMARY OF THE INVENTION

The foregoing problem is solved, and a technical advance is achieved by a processor controlled data conferencing arrangement wherein the data conference bridge has the ability to configure itself into a plurality of different modes according to the data terminal it is currently communicating with.

More specifically, the data conference bridge in this embodiment is designed to receive and transmit at least two different data speeds. Thus, it can receive at one speed and forward the information to other conferees either at the same speed or a different speed, depending on what type of terminal the other conferees have.

Furthermore, the conference bridge in this embodiment is capable of providing conferencing for many small conferences or up to 64 conferees on a large conference. To handle the voluminous amounts of data, the conference bridge features a shared buffer memory which is accessible by several distributed processors arranged in a hierarchical structure. At the lowest level, a processor associated with each conference port satisfies the stringent real-time requirements of receiving data from a conferee, putting the data in a shared buffer memory, and taking data from the memory for transmittal to another conferee. The intermediate level processors each function with several port processors to perform certain protocol functions, such as error and flow control, while the highest level processor in the bridge performs general conference control, administration and maintenance.

The processors communicate with each other via imbedded memory. More specifically, each port processor occupies memory space in the intermediate level processor with which it must communicate, while the intermediate level processors occupy memory space in the highest level processor. Thus, the highest level processor has access to any part of the data bridge.

DETAILED DESCRIPTION

Figure 1:
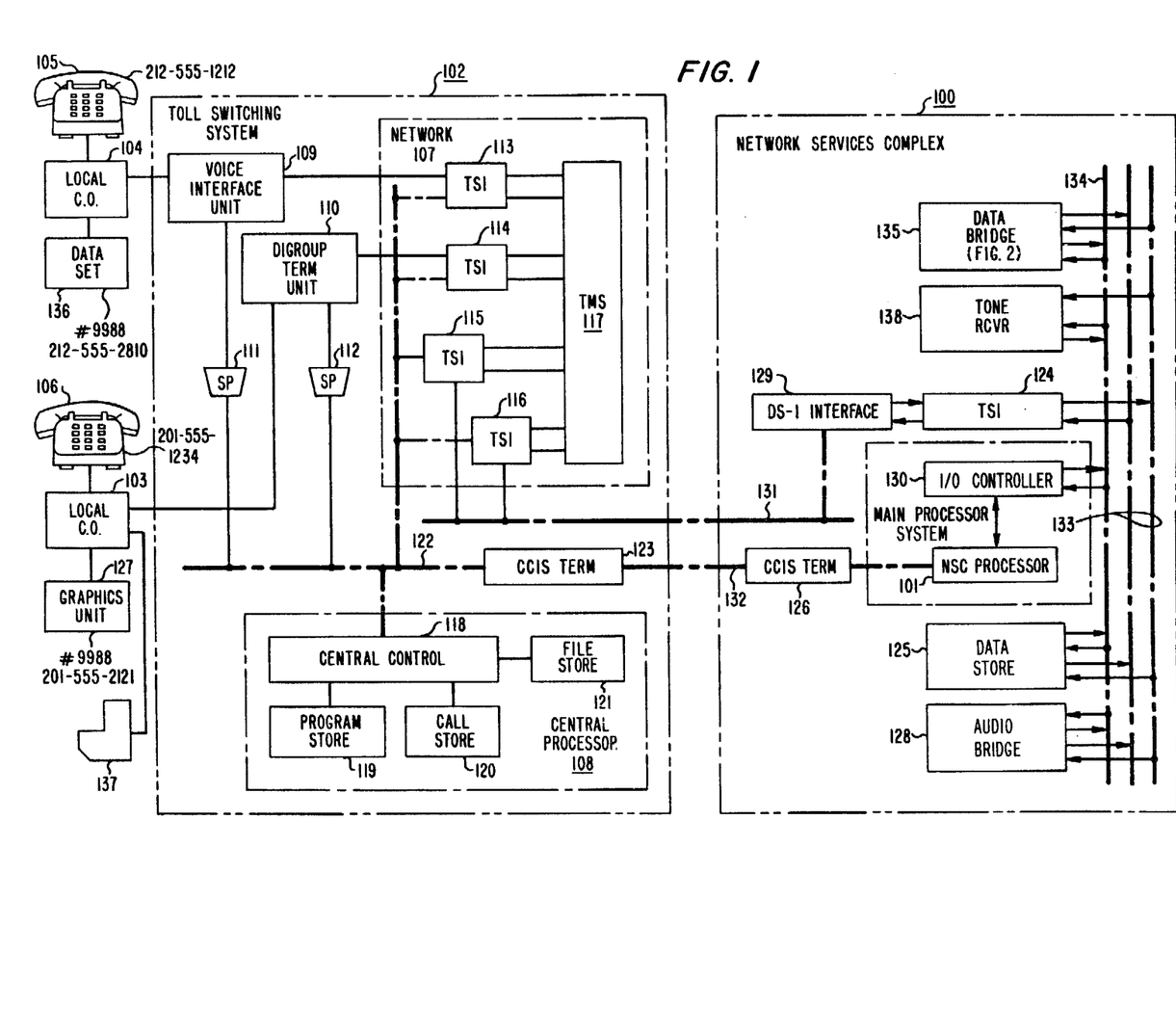
FIG. 1 shows a block diagram of a communication network having a network services complex including a data conference bridge according to the invention.

The general organization of a system employing the invention is illustrated in the block diagram of FIG. 1 which shows a typical communications network having a toll switching system 102 which serves local central offices 103 and 104. Central offices 104 and 103 contain the switching apparatus for providing communication services to customer stations 105 and 106, respectively, and data service to data set 136 and graphics unit 127. Connected to switching system 102 is a network services complex 100 for providing special services such as teleconferencing and data conferencing.

Network services complex 100 includes NSC processor 101, data bridge 135 and other units. As will be described in more detail below, one of the functions of complex 100 is to provide facilities for conferencing data customers over the telephone network via the toll and local switching offices.

Toll switching system 102, as depicted in FIG. 1, is a typical electronic switching system, such as, the system described in detail in the *Bell System Technical Journal*, Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113-116 and time multiplex switch (TMS) unit 117.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 is connected to the toll office over the digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 provides the scan, distribute and digit reception tasks for analog trunks, while signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. A typical processor suitable for use in the illustrative toll switching system is described in the *Bell System Technical Journal*, Vol. 56, No. 2, February 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal*, Vol. 57, No. 2, dated February 1978, and is represented herein by CCIS blocks 123 and 126 and data link 132. While terminal 126 is referred to as a CCIS terminal, it is not necessary that this terminal be part of the CCIS signaling network used for call processing. Instead, the term CCIS is meant to illustrate the type of terminal suitable for exchanging data with the toll switching system.

Coupled to the toll switching system is the network services complex 100 comprising NSC processor 101, CCIS type terminal 126, DS-1 interface 129, time slot interchange 124, input/output control 130 and data bridge 135. Network services complex 100 can also include other units such as an audio bridge 128, data store 125, tone receiver 138, etc.

It is intended that network services complex 100 function with many different types of switching systems to provide several special services in addition to those mentioned above. As such, complex 100 has been designed to connect to a switching system via conventional interoffice trunks 131 and a data link 132. The interoffice trunks 131 serving complex 100 are digital facilities similar to the trunks between toll office 102 and local office 103 as described above and the data link 132 and its CCIS terminals are similar to those described in the 1978 *Bell System Technical Journal* cited above.

The network services complex is modularly designed to allow for various service units to be added. All units are interconnected over a time-multiplexed data bus (TMDB) 133 and a serial control bus (SCB) 134. The control bus is used by the NSC processor 101 to communicate control, status and error information with the various units in the complex. Data bus 133, which is used for customer data to be conferenced, consists of a transmit bus and a receive bus and each bus is a 256 time slot time-multiplexed PCM data bus.

Interface 129 connects the T1 lines 131 from toll switching system 102 to time slot interchange unit 124 which switches any time slot in the receive T1 bus or the transmit portion of data bus 133 with any time slot on the T1 transmit bus or the receive portion of data bus 133.

The network services complex 100 is controlled by NSC processor 101 which performs all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For this illustrative embodiment, let it be assumed that the complex is equipped with a data conference facility designated by block 135 and the conference facility will be used for establishing data conferences under customer control.

If a customer having data set 136 wishes to establish a conference between his data set and other data sets, the customer places a call using his telephone set 105 and keys in the telephone numbers of all conferees to be added to the data bridge. NSC processor 101 in cooperation with central processor 108 establishes communication paths via time slot interchanger 124 between each conferee data set and the data bridge 135. In general, data bridge 135 receives requests for connecting and disconnecting conferees to and from the bridge in the form of orders from NSC processor 101 over control bus 134. The nature of these orders will not be described herein since a detailed knowledge of this is unnecessary for a full understanding of the present invention.

Figure 2:
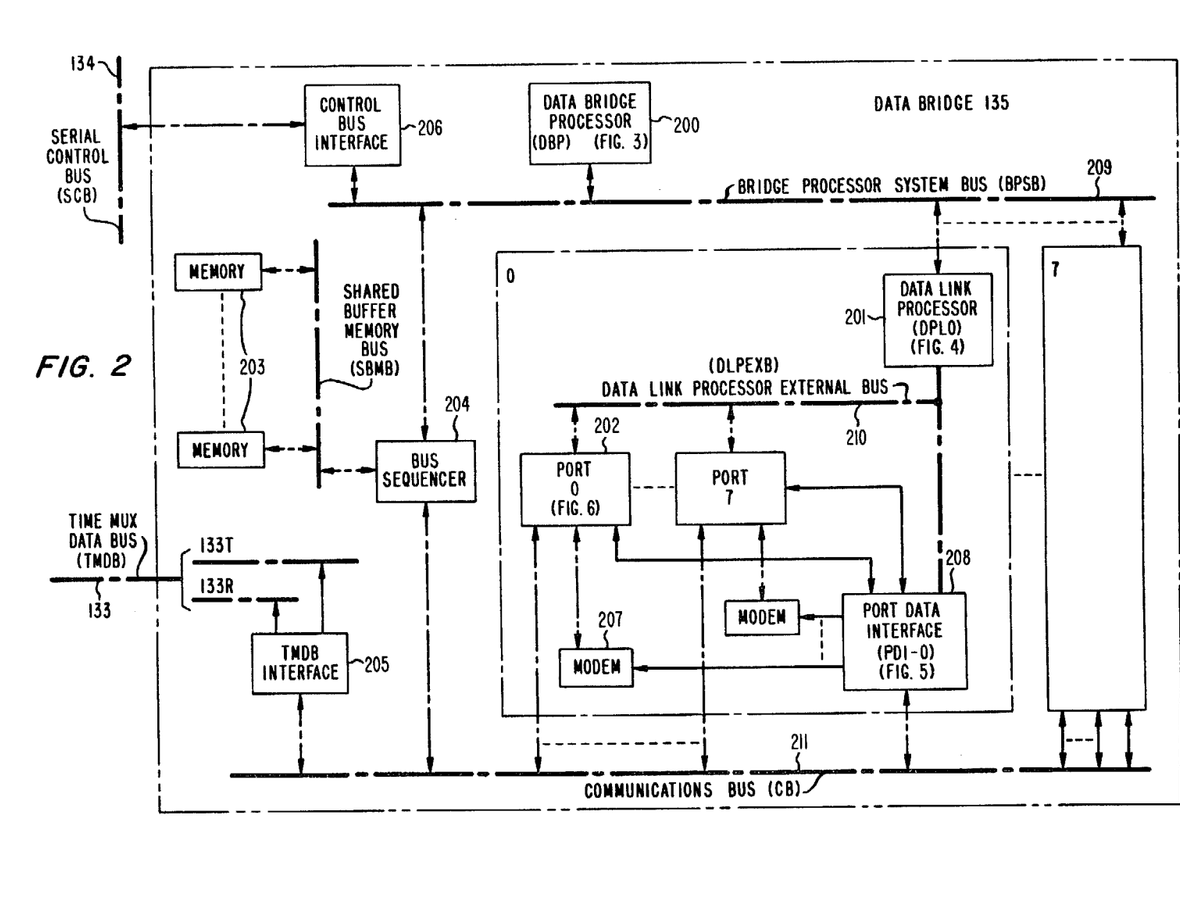
FIG. 2 shows a more detailed block diagram of the data bridge.

The apparatus of the data bridge is more fully disclosed in FIG. 2. As shown in FIG. 2, data bridge 135 comprises data bridge processor 200, a plurality of data link processors such as 201, a shared buffer memory 203 and a bus sequencer 204. Associated with each data link processor is a port data interface, such as 208 and a plurality of ports, such as 202. In this illustrative embodiment, eight data link processors are provided in the data bridge and each data link processor is equipped to serve eight ports for a total of 64 ports per data bridge.

The data bridge interfaces with the network services complex via two buses, namely, the serial control bus 134 which handles the control functions and the time multiplexed data bus 133 which handles the data functions.

Access to the control bus 134 is determined by NSC processor 101 acting as a master unit with units such as data bridge 135 acting as a slave. Each slave has a designated interrupt lead to signal the master when the slave wants to use the bus and the master has a cutoff lead associated with each slave's to halt the slaves operation on the bus.

The time multiplexed data bus 133 is a bit parallel, word sequential, bi-directional data bus providing 256 channels at a 64Kb/sec bit rate. Sixty-four of the channels (i.e., one per data bridge port) are dedicated to the data bridge in this embodiment, and the other channels are used for other slave units such as audio bridge 128.

For illustrative purposes, it has been assumed that customers using the data bridge will communicate over the network trunks using at least two different modes of communication. Thus, some customers will use trunks that provide a 4.8Kb/sec half-duplex connection while other customers will use trunks that provide a full-duplex connection at a 56Kb/sec data rate.

Each of these modes of data communication will also require different sequences of signals between the customer's data terminals and the data bridge. However, the bridge will appear transparent to the different terminals by virtue of its ability to configure itself to the data speed and signaling of any trunk.

It has also been assumed for purposes of illustration that the data terminals communicate over the network to the data bridge using the Group IV facsimile protocol recommended by the CCITT but not yet standardized. Of course, it will be obvious to those skilled in the art that there are other data speeds and protocols that can be used within the spirit and scope of the invention.

The proposed Group IV protocol is a 7-layer protocol, but not all levels need be utilized by the data bridge. Level 1 provides the mechanical, electrical, functional, and procedural characteristics to establish, maintain and disconnect circuits between data terminals and switching equipment. This level may indicate full-duplex or half-duplex operation, synchronous or asynchronous operation, etc. Level 2 is referred to as the "link layer" and deals with initiation, error control, and flow control. While level 3 is minimally implemented in this embodiment of the data bridge, it could be fully implemented within the spirit and scope of the invention.

Level 4, called the "transport layer," will be implemented in such a manner that the data bridge will always originate a "transport connection request", specify octet block size, split large frames from high speed terminals into small frames for slower terminals, etc. Level 5, on the other hand, is the "session layer" which establishes, administers, and transmits communication between two end point facilities (in this case, the data bridge and each terminal). In other words, the two end point facilities must exchange information as to their capabilities with respect to device types and terminal features.

Level 6 of the protocol is referred to as the "document layer" and defines the data types and document composition, while the level 7 protocol may be defined by the user and will not be discussed herein.

Returning now to FIG. 2 and a description of the apparatus, data bridge processor 200 is the main control processor. It interfaces with NSC processor 101 via serial control bus 134 from which it receives conference configuration information and to which it reports conference status. Data bridge processor 200 is connected to the shared buffer memory 203 via the bridge processor system bus 209 and bus sequencer 204. It is from the shared buffer memory 203 that the data bridge processor 200 obtains session and document protocol data. Data bridge processor 200 can also access the various data link processors via bus 209 to control port configuration and monitor the port status. Furthermore, the overall maintenance functions of the data bridge are performed under the control of the data bridge processor.

Each data link processor interfaces with eight high-level data link control (HDLC) ports, such as port 202, to control the port configuration as commanded by data bridge processor 200. The data link processors also handle all link-level protocol procedures except synchronization, cyclic redundancy checking and bit insertion.

The ports, such as port 202, handle actual frame transmission and reception of the level 2 protocol. The ports interface with a port data interface such as 208 from which they receive 56 Kb/sec serial data, and they interface with a modem such as modem 207, from which they receive 4.8 Kb/sec serial data. The ports can also interface directly with the shared buffer memory on a time-shared basis via communications bus 211 to read out of the memory information to be transmitted over the network to a conferee or write into the memory data received from a conferee as directed by the associated data link processor.

The major modules of the data bridge shown in FIG. 2 have also been shown in more detail in other figures of the drawing. A description of these modules will now be given beginning with a description of port 202 as shown in FIG. 6.

Port 202 receives and transmits high-level data link control (HDLC) frames in serial format at data rates determined by external clocks. In this illustrative embodiment, only two data rates are being considered, namely, 4.8 Kb/sec and 56 Kb/sec. The port also performs all of the data transfer to and from the shared buffer memory 203 for the information portion of the frames, and the port determines when and where to receive and transmit frames by commands received over bus 210 from its associated data link processor. After a command is executed by a port, the port responds to the data link processor to indicate the command has been executed. Communication between the port and its data link processor is via a shared memory imbedded in the memory space of the data link processor.

Figure 6:
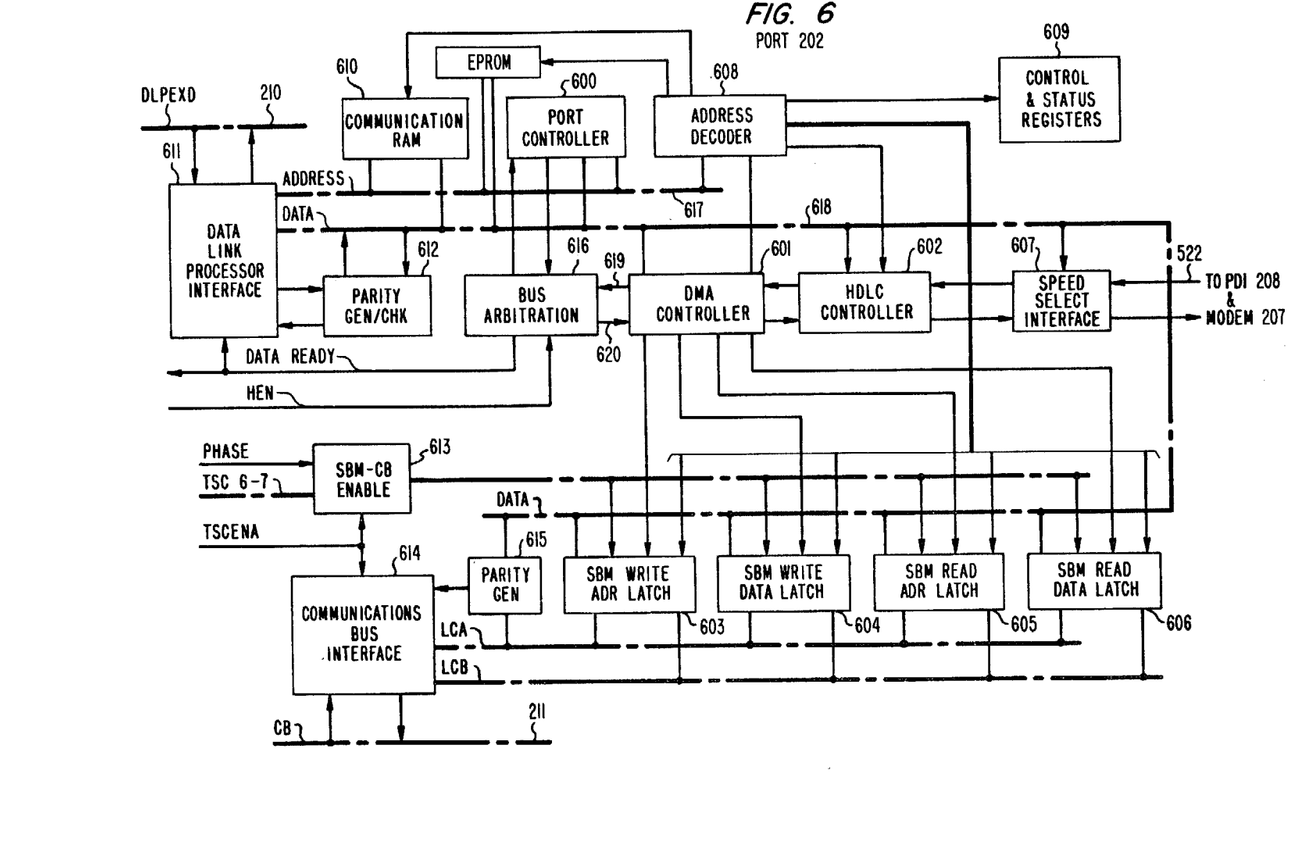

As shown in FIG. 6, the port consists of a port controller 600, direct memory access (DMA) controller 601, high-level data link (HDLC) controller 602, communications RAM 610 and other devices for interfacing with the various bus systems.

The port controller 600 includes a microprocessor, with an associated EPROM for program storage, and provides control of the port by executing commands received over bus 210 from the data link processor. A port can function to transmit a frame and receive a frame of data at the same time. The port has an internal address bus and a data bus 617 and 618, respectively, and these buses are coupled to the data link processor external bus 210 via interface 611. Within the port itself, buses 617 and 618 are directly coupled to RAM 610 and port controller 600 and are coupled via address decoder 608 to the DMA controller 601, HDLC controller 602, and the shared buffer memory address latches and data latches 603–606. The port controller 600 controls the operation of the other above-mentioned devices over buses 617 and 618.

Since the data link processor 201 (FIGS. 2 & 4) can read and write all of the same external addresses that port controller 600 within the port can, and the DMA controller 601 can access the shared buffer memory address latches and data latches 603–606 via buses 617 and 618, a bus arbitration unit 616 is provided. This allows data link processor 201, DMA controller 601, and port controller 600 to share access to the port address bus 617 and port data bus 618 as required.

When DMA controller 601 needs access, it asserts a hold request signal over conductor 619 which causes port controller 600 to stop execution at the beginning of its next cycle. An acknowledge signal is returned over conductor 620, and DMA controller 601 has access to the bus until it removes its request. When data link processor 201 needs access to the bus, it simply addresses the port, and port controller 600 stops at the beginning of the next instruction. If both DMA controller 601 and data link processor 201 request access to the port bus, the device which first requested is given access, and the DMA controller 601 is given preferred access when simultaneous requests are received at the port.

The data link processor 201 sends orders to the port controller via the shared communications RAM 610.

Data from a conferee is received by the port from the port data interface or from a modem, and the port is directed to function at a particular data rate by a signal from the port data interface. If the port is to receive data from a conferee who is transmitting at the 4.8 Kb/sec data rate, the information is sent via a modem (such as modem 207 in FIG. 2) to speed select interface 607. Interface 607 provides the 4.8 Kb/sec data and control information to be used by HDLC controller 602 and port controller 600 firmware. Interface 607 also provides several control signals to the modem.

The HDLC controller 602 provides framing, bit stuffing, cyclic redundancy generating and checking functions, and serial to parallel data conversion between the port 8-bit parallel data bus and the port data interface 208 or modem 207.

The HDLC controller 602 is under control of port controller 600. For example, port controller 600 could write a "receive" command coupled with a "maxium buffer length" into the HDLC controller 602. The HDLC controller would then receive bytes of data and put them in the shared buffer memory via DMA controller 601 and the write latches 603 and 604. Upon completion of the frame, the HDLC controller 602 would notify port controller 600, and controller 600 could read the results.

As mentioned above, the port controls the read/write functions of all conferee data out of and into the shared buffer memory. Access to the shared buffer memory is on a fixed time-slot basis over communications bus 211 via interface 614 and enable circuit 613. Each port is assigned one read and one write cycle every 125 $\mu$sec which provides an effective data rate of 64 Kb/sec that exceeds either of the two different modes of customer communication described above.

The read and write portions of DMA controller 601 handle read and write requests from HDLC controller 602. DMA controller 601 also manages the data and address latches 603–606 and determines when read and write functions are to be done.

The initial address of a frame consists of 24 bits making 16 megabytes of a shared buffer memory accessible to a port. The memory is divided logically into 1 Kbyte blocks and a new address is written for each frame.

To receive a frame, the port controller simply loads the DMA controller 601 with the lower 16 bits of the frame address while the upper 8 bits are loaded into the write address latch 603. The maximum byte length of a frame is loaded into the terminal count of the write portion of DMA controller 601. When a byte becomes available from HDLC controller 602, DMA controller 601 gains access to the port buses and loads the low-order 16 bits into the write address latches. The DMA controller then enables data to come from the HDLC controller to the write data latches 604.

Each port is guaranteed one shared buffer memory read and one write every 125 $\mu$sec and when the appropriate time slot count is decoded, the read or write is done based on the latched read or latched write signal. When the latched write signal has been set, the next time a write time slot for the shared buffer memory occurs, the upper 16 bits of the address are strobed onto communications bus 211 followed by the lower 8 bits of the address and the received data byte. The latched write signal is then cleared automatically. Similar action takes place for reading the shared buffer memory except that data from the shared buffer memory is strobed into the read latch to be transmitted.

The port 202 shown in FIG. 6 also contains control and status registers 609. The control register can be set by the local port controller 600 or by the data link processor 201 and the register is selectively set to cause certain events to occur. For example, a "cut-off" bit can be set in the register by the data link processor to cause the port controller to be removed from service. Also, the port controller can set a "service" bit when it requests action by the data link processor. Setting the service bit causes an interrupt to the data link processor.

The status register contains several bits which can be set by various units in the port to report their status. A bit designated "digital" is set by the port data interface to indicate the data speed that the port is to receive, and the status register contains other status bits which indicate when a write or read to the shared buffer memory has occurred.

The port data interface 208 is shown in more detail in FIG. 5 and now will be described. In this illustrative embodiment, the port data interface functions with eight port units, such as port 202, which is shown in FIG. 6. The port data interface performs the function of interfacing the ports and the time multiplexed data bus for the different modes of transmission utilized by conferees. As mentioned above, for purposes of illustration, the conferees can communicate over the network channels using 4.8 or 56 Kb/sec data rates. Port data interface 208 receives data from and transmits data to the network services complex time-slot interchange 124 (FIG. 1) via the time multiplexed data bus 133 and communication bus 211 at a 64 Kb/sec rate compatible with the standard T1 trunks at the toll switching center 102. Thus, each 8-bit byte of data at the T1 data rate on communication bus 211 may represent either a 4.8 Kb/sec conferee channel or a 56 Kb/sec conferee channel.

For the 56 Kb/sec conferee, the port data interface strips off one signaling bit and converts the remaining 7-bits of data from its parallel format on communication bus 211 into a serial format which it transmits directly over conductor 522 to the speed select interface unit in port 202.

For a conferee transmitting at a 4.8Kb/sec rate over the network, the 8-bit data byte is converted to serial and transmitted to CODEC 520. CODEC 520 converts the serial PCM informaton to analog and transmits the analog signal to modem 207 (shown in FIG. 2). Modem 207 converts the analog signal back into a digital format, and this data stream is transmitted to the speed select interface in port 202. Then, as mentioned above, the port can store the data in the shared buffer memory using the communication bus 211 and the time multiplexed data bus 133.

Thus, the data stored in the shared buffer memory after being processed by the port data interface and the port is in the same format for all conferees regardless of the data rate that the conferee terminals were using. This data can then be extracted from the shared buffer memory by any port for transmittal to any conferee at the data rate compatible with that conferee.

Figure 5:
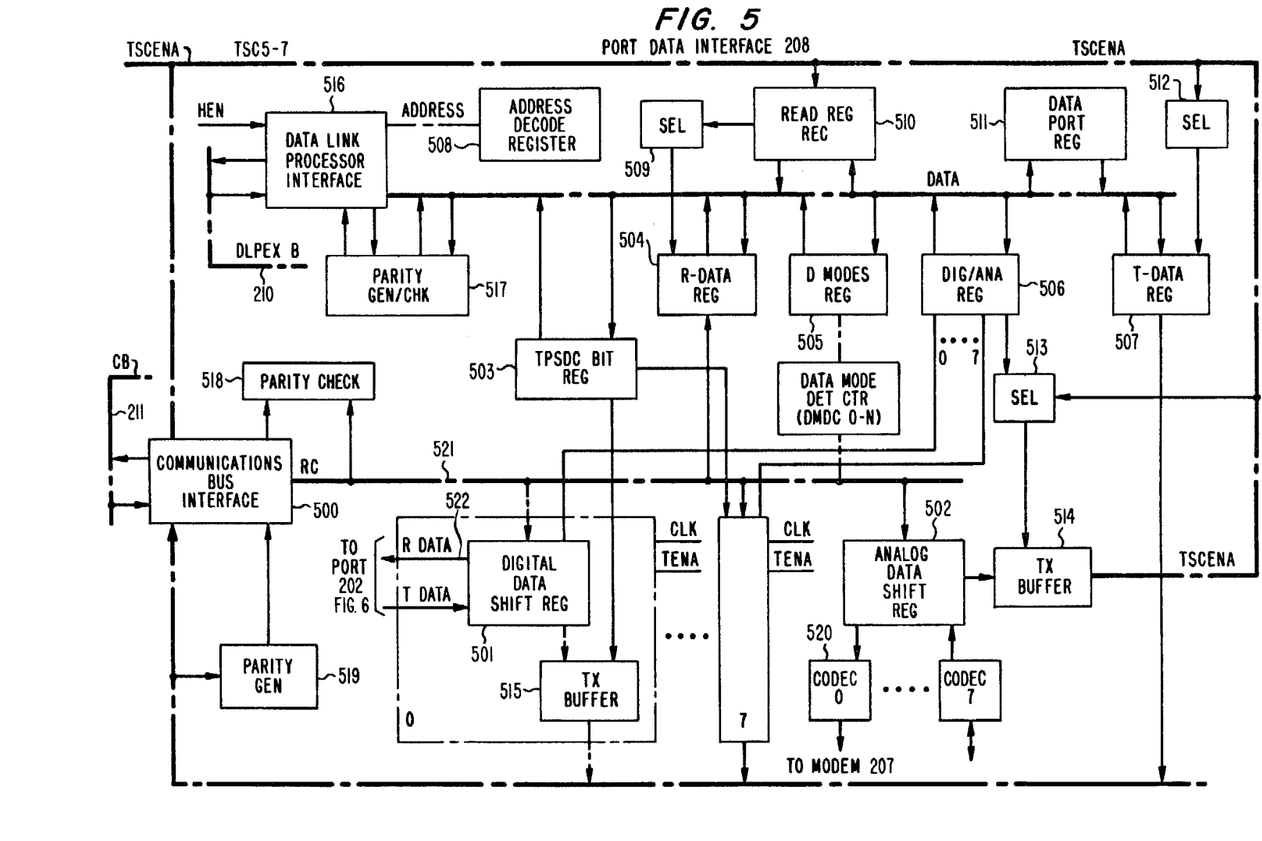
FIG. 5 depicts the port data interface which interfaces a data link processor with a plurality of ports, such as the port shown in FIG. 6.

The port data interface 208, as shown in FIG. 5, has seven control registers which can be accessed directly by the data link processor over bus 210, and these registers control the selection of data speed conversion and the transmission of an idle code on an idle channel as dictated by the data link processor 201.

Receive data register 504 and transmit data register 507 are 8-bit registers that are used for writing and reading, respectively, data to and from the time multiplexed data bus via communication bus 211.

The other registers are formatted so that each register contains a bit for each port and each register corresponds to a function for the ports as follows: register DIG/ANA 506 contains a bit per port which determines the bit rate to be transmitted and received by the port, register DATAPORT 511 contains a bit per port which enables or disables the serial data to be sent or received to or from a port, register DMODES 505 is a read-only register which contains a bit per port that indicates whether or not the 56 Kb/sec channel is receiving a data mode indication from the far-end terminal, the register TPSDC BIT 503 also contains one bit for each port and specifies that the eighth bit of each byte of the 56 Kb/sec data stream should be transmitted over the time multiplexed data bus, and register READREG 510 contains one bit per port; and, when the bit is set, the contents of the time multiplexed data bus for that port is read into receive data register 504.

The operation of the port data interface can best be understood by describing how the port data interface handles data when the conferee is utilizing 56 Kb/sec data terminal, and the data must be transmitted between a port and the time multiplexed data bus which handles data at 64 Kb/sec.

Let it be assumed that the data link processor has transmitted an order to the port data interface to set the DIG/ANA register 506 to indicate that port 202 should be in the 56 Kb/sec data speed mode. Eight-bit parallel data received from the time multiplexed data bus via communication bus 211 is checked for parity by parity check circuit 518 and shifted into a digital data shift register such as 501 which corresponds to port 202. The signaling bit which indicates whether the far-end terminal is in the control or data mode is stripped off the incoming signal and the remaining seven bits are shifted out serially via conductor 522 to the port. At the proper time, port 202 can enter the data in stored buffer memory 203. At the same time, serial data from the port which was read out of memory 203 is shifted into register 501, and after seven bits have been collected, a signaling bit is appended thereto and eight bits are loaded into transmission buffer 515. At the proper time-slot count, buffer 515 is unloaded to transmit the data over communications bus 211 and the time multiplexed data bus and via the time-slot interchange 124 to the far-end terminal.

The signaling bit indicates the mode of the channel. More specifically, in the voice mode the bit will change from 0 to 1 and vice versa, while in the digital data mode, the bit is a contiguous stream of ones and a contiguous stream of zeros are sent out to indicate the digital control mode.

The received signaling bits are counted to determine whether the channel is in the data or control mode and any change in the mode causes an interrupt signal to be sent to the data link processor.

The bits in each of the registers 506 and 511 when taken together, specify the state of each port. Thus, a 0 or 1 in the DIG/ANA register 506 indicates the channel is in the 56 Kb/sec or 4.8 Kb/sec mode, respectively. Furthermore, if the port is in the 56 Kb/sec mode, then the 0 or 1 in the DATAPORT register 511 indicates the control or data mode of the channel, respectively. In the control mode, whatever has been loaded in the transmit data register 507 is sent over the time multiplexed data bus, while in the data mode, serial data from the port is sent out.

The port data interface under control of the data link processor will go through three general sequences for setting up and taking down a leg to a data conferee. A monitor sequence is executed to determine whether the far-end (i.e., conferee) terminal is in the control mode or not. In this sequence, the conference originator's voice path is connected to both the transmitting and receiving paths of the far-end terminal via the time-slot interchange unit of the network services complex. The port data interface is connected only to the receiving path from the terminal through the same time-slot interchange unit, and since the far-end terminal is in the voice receiving mode, it will either be in the control or voice mode but not the data mode.

The monitor sequence is initiated when the data link processor sets up the port data interface to read data from the time multiplexed data bus. This is accomplished by setting the bit for port 202 in register 506, conditioning the port data interface to receive data at the 56 Kb/sec data rate. The data port (DATAPORT) register 511 is also set for this port to disable serial data from the port and to cause the output of transmit data register 507 to be transmitted over the time multiplexed data bus.

The contents of the receive portion of the time multiplexed data bus are then read into receive data register 504, and a software counter is set up to count the number of time slots that the "control mode idle" code is received. Every 125 µs a new byte is available in register 504. If the control mode idle character is not found, it means that the far-end terminal is not in the digital control mode.

Figure 7:
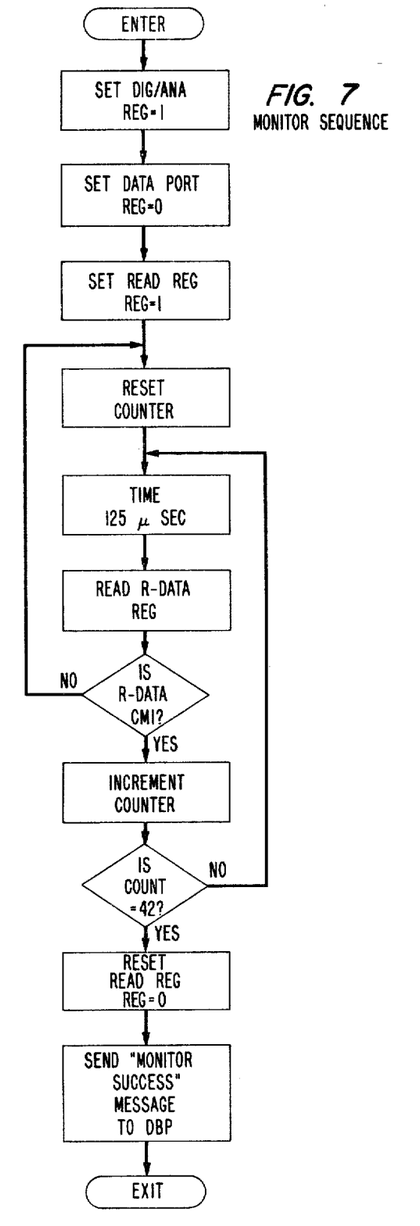
FIG. 7 shows the flow diagram describing the sequence of operations for monitoring a conference leg (i.e., port)

Each time a control mode idle character is detected, the counter is incremented and eight consecutive bytes must be received before the data bridge determines that the far-end terminal is in the control mode. Upon detecting that the port is in the control mode, a "monitor success" response is reported by the data link processor to the data bridge processor. A flow chart of this sequence of events is shown in FIG. 7.

The connect sequence of events describes the data link processor and port data interface operation in setting up a port so that it can be added to a conference. This sequence is shown in the flow diagram of FIG. 8 and begins by executing the monitor sequence described above. The data link processor also sets the transmit data register 507 to the control mode idle byte, and the control mode idle character is transmitted to the far-end terminal eight times.

Figure 8:
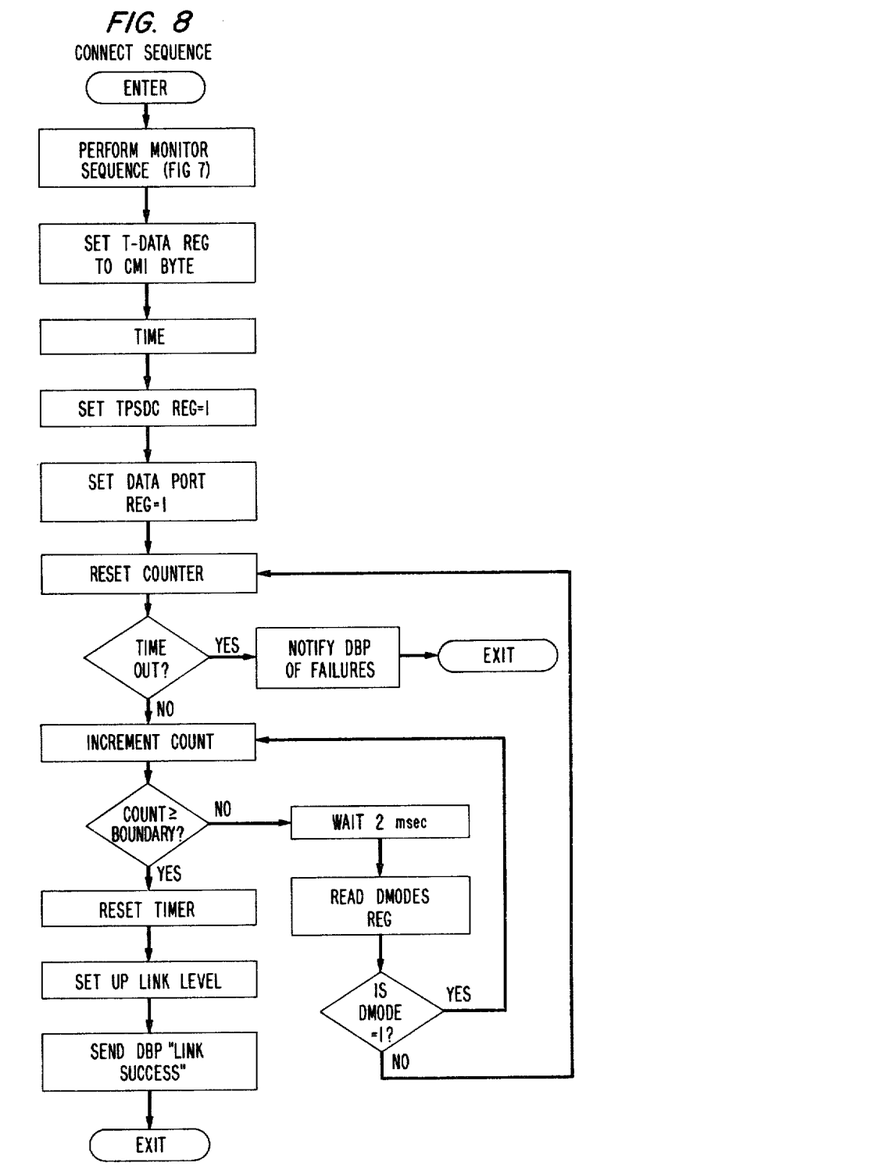
FIG. 8 shows the flow diagram describing the sequence of operations for connecting a leg to a conference.

The data link processor then sets the bit in register 503 associated with port 202 causing the digital data mode character to be transmitted. Also, the bit in DATAPORT register 511 is set to enable the port to transmit and receive serial data.

A software counter is then set up to time the interval it takes for the far-end terminal to switch to the data mode, since after the bit in register 511 is set, the incoming signaling bit should eventually change to a series of ones indicating that the far-end terminal has switched to the data mode.

If a time-out occurs before the far-end terminal changes mode, a link failure message is sent by the data link processor to the data bridge processor, and the connect attempt is aborted.

If a change of mode is detected, the counter is incremented and a count of 48 consecutive ones of the signaling bits must be detected to signify a change to the data mode. When a change to the data mode is detected, a link success message is sent by the data link processor to the data bridge processor.

A disconnect sequence is entered into by the data link processor to terminate transmission on the channel. The sequence is initiated by an order from the data bridge processor to the data link processor, while the channel is being monitored for the control mode or while the channel is being set up or is operational on a data conference call.

When the data link processor receives the command, it resets the READREG register 510, DATAPORT register 511, and the DIG/ANA register 506 and upon completion, notifies the data bridge processor that the link has been successfully disconnected.

As mentioned above, eight data link processors are provided in this embodiment of the invention to interface the ports with data bridge processor. The basic function of the data link processor is to control the configuration of its eight ports as directed by commands for the data bridge processor and also to handle all link level protocol procedures except synchronization, cyclic redundancy checking and bit insertion. Furthermore, the data link processor reports back to the data bridge processor when specific tasks have been executed.

Figure 4:
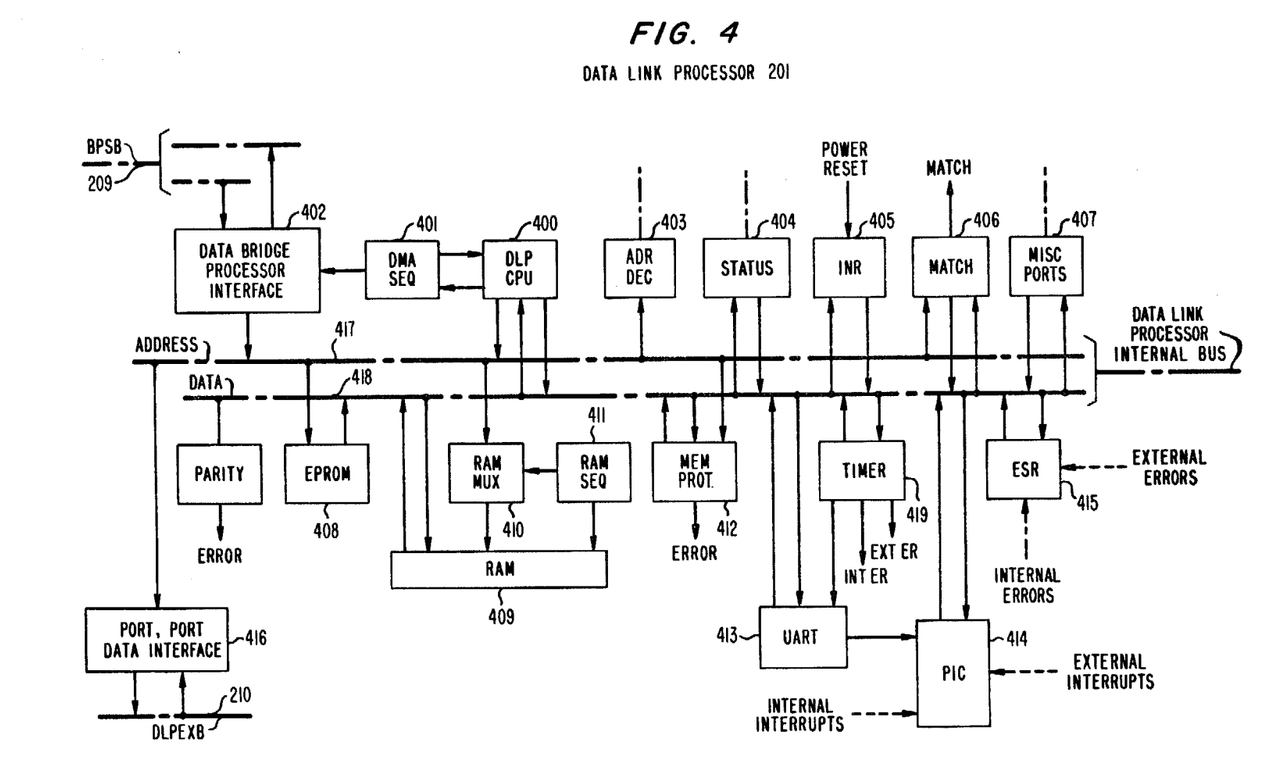
FIG. 4 shows a block diagram of a typical data link processor.

The data link processor is an 8-bit microprocessor based system and as shown in FIG. 4 comprises a read-only memory 408, a RAM 409, a programmable interrupt controller 414, a programmable timer 419, and various other units. The data link processor interfaces with the data bridge processor via the bridge processor system bus 209 and interface 402. Likewise, access to the port data interface and the ports is via the data link processor external bus 210.

The central processing unit 402 is an 8-bit central processing unit which is interconnected with the other units of the data link processor via an 8-bit data bus 418 and a 16-bit address bus 417.

The data bridge processor (FIGS. 2 & 3) addresses one of the data link processors over the bus 209 and interface 402. Once data link processor 201 is selected, the central processor 400 relinquishes control of address bus 417 to permit the data bridge processor to select data within the data link processor.

Priority interrupt controller 414 allows for several levels of priority interrupt caused by units within the data link processor and external units in its corresponding port data interface and the eight ports associated therewith.

When an interrupt is received by controller 414, it transmits an interrupt request to processor 400. Processor 400 ascertains the nature of the interrupt and jumps to the first instruction of the interrupt service routine to be performed.

Error source register 415 provides the means for processor 400 to recognize errors occurring within the data link processor or externally. Internal errors can occur as a result of a parity failure detection on one of the buses, time-outs, RAM failure, etc. Hardware failure in the port data interface or ports are considered external error failures insofar as the data link processor is concerned, and these are detected by register 415.

The status register 404 is provided to indicate the status of several hardware units within the data link processor or under its control. Also, certain bits in the status register can be set by the data bridge processor to cause the data link processor to interrupt the data bridge processor or to be reset.

The data link processor shown in FIG. 4 also includes an interface 416 which permits the data link processor to interface with the ports and the port data interface. Certain of the leads of address bus 417 are extended via the interface to the ports and to the port data interface along with the data bus 418. The output of address decoder 403 selects the port data interface or one of the ports. When a port is selected, the data link processor must wait for the port to complete its current memory cycle before the data link processor can use the port bus. The port controller then relinquishes the bus to the data link processor allowing the data link processor to complete its operation within a fixed time interval.

Figure 3:
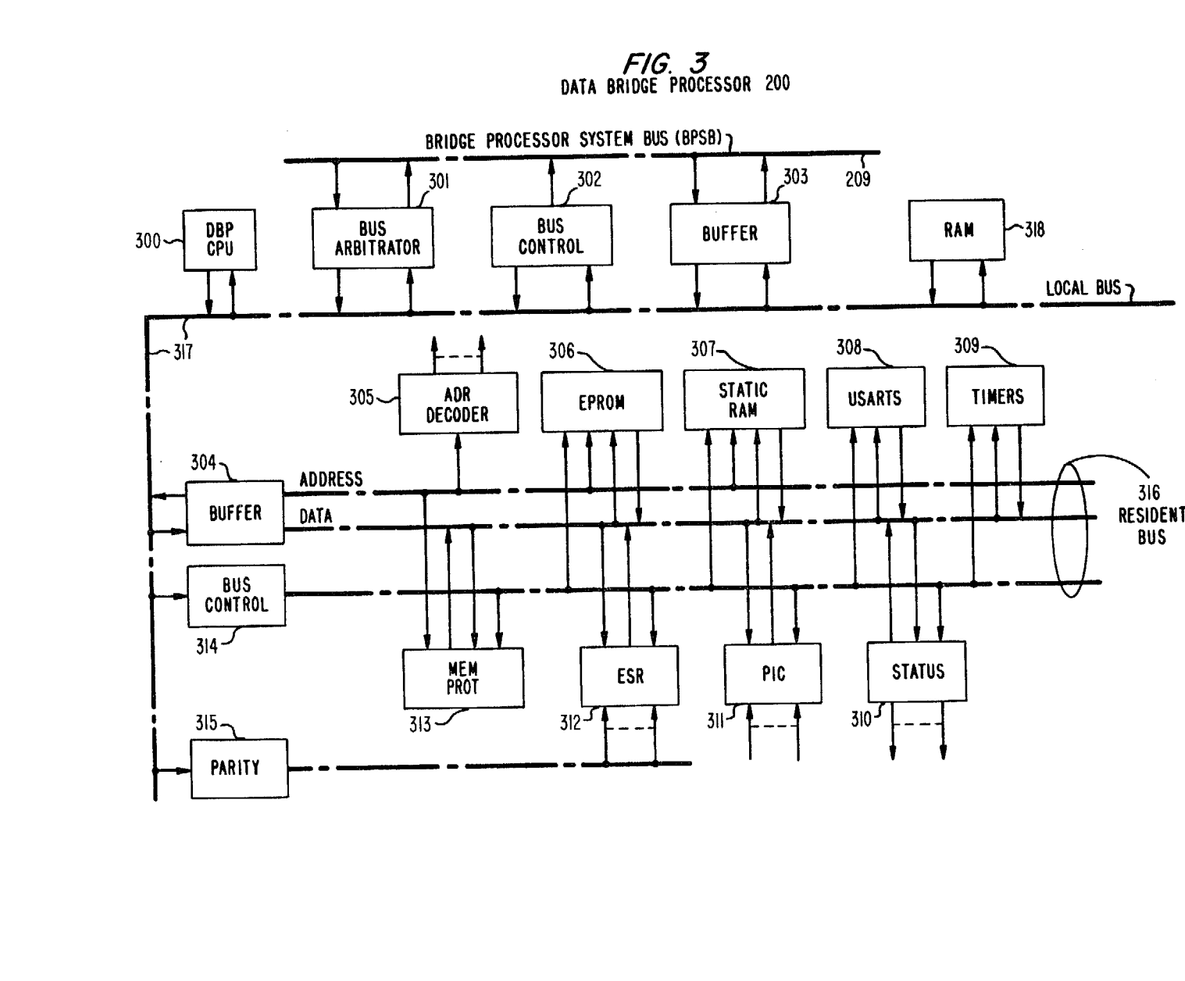
FIG. 3 shows a block diagram of the data bridge processor.

The data bridge processor is the main control processor of the data bridge system and is shown in FIG. 3. In this embodiment, the data bridge processor comprises a 16-bit central processing unit 300, memories 306, 307 and 318, priority interrupt controller 312 and other miscellaneous circuits.

Central processing unit 300 utilizes two resident memories, namely, RAM 307 and EPROM 306 and accesses these memories via a resident bus 316. For program storage and for scratch pad memories, the data bridge central processing unit 300 utilizes dynamic RAM 318 which is accessible over local bus 317.

The data bridge processor has access to the bridge processor system bus 209 via bus arbitrator 301, bus control 302, and buffer 303, and it is over this bus that the data bridge processor can access the shared buffer memory 203 and any of the eight data link processor memories previously described. Furthermore, it is over bus 209 that the data bridge processor can communicate with the network services complex processor 101.

Priority interrupt controller 312 provides prioritized interrupts from the units within the data bridge processor and also from external units such as the eight data link processors. The controller 312 automatically resolves the priority among the simultaneous interrupts according to a preassigned schedule.

The shared buffer memory 203 as shown in FIG. 2 is used to temporarily store the data that is passed among the ports and the data bridge processor during a conference. In this embodiment of the invention, the memory is made up of six modules of dynamic RAM wherein each module contains up to 512 kilobytes of memory.

The memory is accessible via communication bus 211 for the ports and via the bridge processor system bus 209 for the data bridge processor and the eight data link processors. Bus sequencer 204 provides the timing, memory refresh and access allocation for these buses.

The 125 µs frame interval is divided into 64 subframes, each corresponding to a port of the data bridge. Every sub-frame is further divided into two port access cycles and one data bridge processor access cycle. During a port access cycle, the shared buffer memory bus 212 is connected to communication bus 211, and the port that has been selected by the time-slot count can drive these buses to read from or write data into the shared buffer memory. The data bridge processor accesses the shared buffer memory during its portion of the sub-frame cycle with the exception of one cycle out of eight which is used for refreshing the memory.

As mentioned above, the data bridge 135 responds to orders from NSC processor 101 for adding and disconnecting legs (i.e., ports or channels) for each conference. A conference is established under the direction of a conference originator who dials the directory numbers associated with the data terminal of each conferee. Upon receiving a request for setting up a data conference, processor 101 examines its memory to ascertain if sufficient resources are available for the conference and reserves a sufficient number of data ports for the conference. The toll switching system 102 at the request of processor 101 then establishes communication paths to each data terminal.

As idle T1 trunks in link 131 are selected for connection over the network to a conferee data terminal, NSC processor 101 couples these trunks via TSI 124 to the time slot assigned to one of the reserved ports. Concurrently, NSC processor 101 sends an "add a leg" command over control bus 134 to data bridge processor 200. This command would identify the conference number, the port number, and the data speed of the terminal to be served by the port.

In response to the "add a leg" command, the data bridge processor sends "allocate" and "connect" orders to the data link processor for the selected port. The allocate order allocates the beginning and end addresses in the shared buffer memory 203 to be used by the port for storing received data, and the connect order defines the data speed of the port. The data speed denotes the clock speed, whether the terminal will operate in a full or half-duplex mode, etc.

In response to the connect order from the data bridge processor, data link processor 201 initializes the port. The data link processor communicates with the port controller 600 via a shared memory as described above. The command to initialize causes the port to be put in a full or half duplex mode and prepares the port for receiving the first frame of data via the time multiplexed data bus.

When the port is initialized, it transmits a response back to the data link processor. The data link processor also responds to the data bridge processor, thereby, informing the data bridge processor that the link level has been initiated.

In response to the acknowledgment that the data link processor has initialized the port, the data bridge processor sends a series of orders through the data link processor and these orders cause the data bridge processor and the terminal to exchange information as to the features and capabilities of the terminal. The data link processor acknowledges to the data bridge processor when a satisfactory reply to each of these orders has been received by the port and informs the data bridge processor when these replies have been put in the shared buffer memory to permit the data bridge processor to access that portion of the shared buffer memory in order to ascertain the features and capabilities of each port.

When all orders have been acknowledged, data bridge processor 200 sends a "leg success" reply to NSC processor 101 indicating that the particular leg has been added to the bridge.

The above sequence of operations takes place for each additional leg to be added to the data bridge until all conferees are coupled to the bridge.

If a conferee data terminal wishes to send a message to the other terminals coupled to the bridge, a "request to send" message is transmitted by the terminal. This action may be initiated by the customer at the terminal actuating a start button.

The request to send the message is put in the shared buffer memory by the port under the control of the data link processor. The data link processor then sends an interrupt message to the data bridge processor indicating that port 202 has stored the received data in the shared buffer memory at a particular address.

The data bridge processor then reads the contents of the shared buffer memory and from the information contained therein ascertains that the terminal connected to port 202 wishes to send data. The data bridge processor examines its memory to ascertain if any other port associated with this conference is already sending messages to avoid having more than one terminal transmitting messages at the same time. If port 202 is the only terminal requesting to send, data bridge processor 200 places an "OK to send" response in the shared buffer memory at a designated address and sends a "transmit" order to data link processor 201 to have port 202 transmit the contents found at that designated address in the shared buffer memory 203.

If it is assumed that no other terminals are attempting to transmit on this particular conference, the response sent by the data bridge processor would allow this terminal to transmit data to the conference bridge. Data is received by the port, and is stored in the shared buffer memory for retransmission to all conferees on the conference.

When the terminal receives an "okay to send" message from the port, it can begin outputting the customer data that is to be conferenced. This data is handled by the port and temporarily placed in the shared buffer memory, and a pointer is sent to the data bridge processor telling the processor where the data is located in the memory.

The data bridge processor recognizes from the information field of the data that this data is to be sent to the other conferees and determines what other ports are connected to this conference. Having determined the ports involved in this conference, the data bridge processor transmits orders to the appropriate data link processors to have the designated ports transmit the message stored in the shared buffer memory to their respective terminals.

Figure 9:
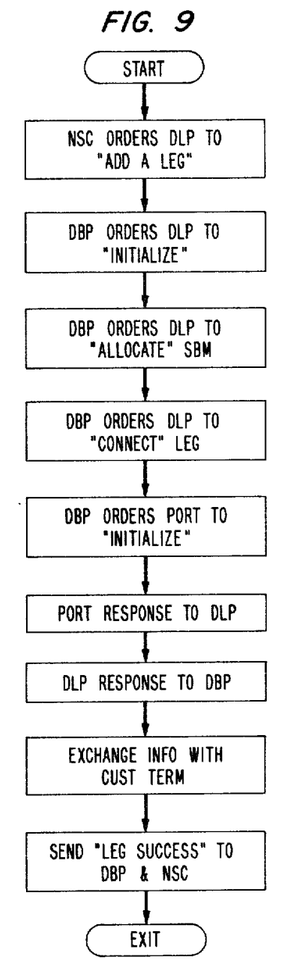
FIG. 9 shows a general flow diagram of the sequence of operations for ordering the connection of a leg to a conference.
Figure 10:
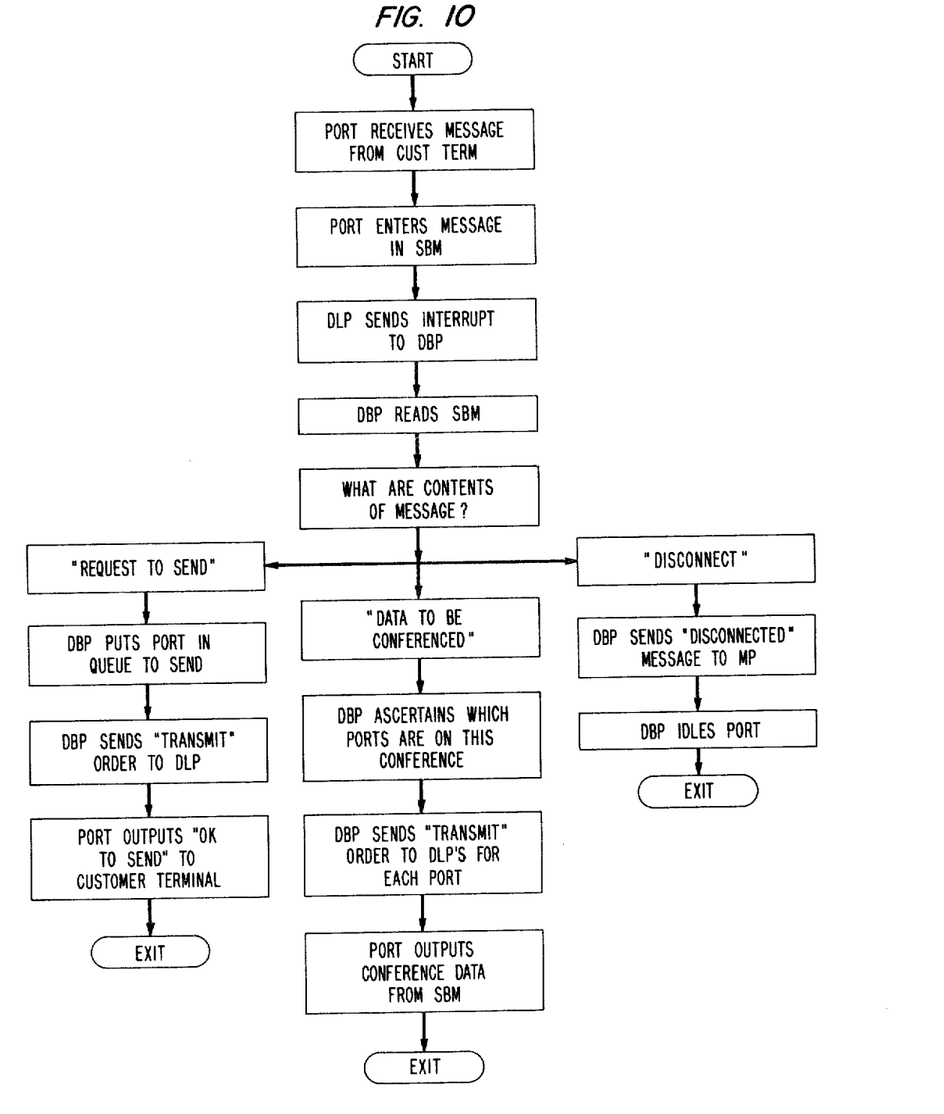
FIG. 10 shows a flow diagram depicting the sequence of operations for receiving any transmitting messages over the conference bridge.

The sequence of operations for establishing a leg and transmitting and receiving data over the legs are set forth pictorially in the flow diagrams of FIGS. 9 and 10.

In summary, a conference arrangement has been disclosed having a multilevel hierarchy of processors with each level performing dedicated functions for establishing and controlling conferences among a plurality of data terminals to efficiently handle large quantities of conference data.

It is to be understood that the above-described arrangements are merely illustrative of the application of the principles of the invention. Numerous other arrangements may be devised by those skilled in the art without departing from the spirit and scope of the invention. For example, the data bridge can be expanded to include additional data link processors and ports if customer demand warrants it.

What is claimed is:

1. For use in a communications network having data terminals, communication channels and a switching system for interconnecting said terminals over said channels for the exchange of data, a conference arrangement comprising processor means coupled to said switching system;

a plurality of ports connectable to said communication channels;

means coupling said ports to said processor means; and a buffer memory connectable to said processor means, said ports and said coupling means;

said processor means comprising means responsive to a conference request signal from said switching system for designating a plurality of ports for conferencing by individually coupling one of said communication channels serving a said data terminal to one of said ports;

each said port comprising means responsive to a data signal from said terminals for storing said data signals at a preassigned location in said buffer memory and for transmitting a data received signal to said processor means indicating that said data signal has been stored; and said processor means responsive to said data received signal from one of said designated ports for ordering the other of said designated ports to transmit over their communication channels to their respective data terminals the contents of said preassigned memory location.

2. The invention defined in claim 1 wherein said data signal comprises control signals and information signals and wherein said port comprises means for exchanging said control signals with said terminal independent of said processor means and means for reporting to said processor means when said control signals have been exchanged.

3. The invention defined in claim 2 wherein said control signals comprise first level and second level signals wherein said port comprises means responsive to said first level signals from said data terminal connected thereto for transmitting response signals to said connected first data terminal, and means for transmitting said second level signals to said memory for storage therein.

4. The invention set forth in claim 1 wherein said data terminals comprises a plurality of first terminals capable of transmitting said data in a first format and a plurality of second terminals capable of transmitting said data in a second format, and wherein said coupling means comprise first circuit means responsive to data from said first terminals for translating said data into a third format for storage in said buffer memory and second circuit means response to data from said second terminals for translating said data into said third format for storage in said buffer memory.

5. The invention defined in claim 1 wherein said ports are divided into a plurality of subgroups, wherein each said port comprises a plurality of latches for transferring said data to and from said buffer memory, an address decoder for enabling said latches and a port controller for addressing said decoder; and wherein said coupling means comprises a plurality of data link processors each associated with a subgroup of said ports, and each said data link processor comprising means for addressing the decoder of each said associated port.

6. For use in a communication network having first data terminals for transmitting and receiving data in a first format, second data terminals for transmitting and receiving data in a second format, communication channels and a switching system for interconnecting said terminals over said channels for the exchange of data, a data conference arrangement for interconnecting said first and second data terminals comprising processor means connected to said switching system;

a plurality of ports each connectable to any one of said terminals via a said communication channel;

a buffer memory for temporarily storing data receiving from said terminals; and means coupling said processor means, said buffer memory and said ports;

said processor means comprising means responsive to a conference request signal from said switching system for designating a plurality of ports to be included in said conference, for indicating the format of the corresponding one of each terminals to be connected to each said designated port and for connecting the communication channel serving the corresponding terminal with the designated port, each said port comprising means for transferring data between the associated terminal and said buffer memory, said coupling means comprising means interposed between each said port and said associated terminal for converting the format of the data received from the associated terminal into a common format for transmittal to said port and for converting the data received from said port in a common format into one of said formats compatible with said associated terminal connected thereto.

7. The invention set forth in claim 6 wherein said coupling means comprises first circuit means for buffering the data from one of said first terminals to the port associated therewith, second circuit means for buffering the data from one of said second terminals to the port associated therewith, and means responsive to said processor means for selectively enabling said first and second circuit means.

8. The invention set forth in claim 7 wherein said data comprises supervisory signals indicating the status of said data terminals and information signals containing the message content to be conferenced, wherein each said port comprises means responsive to said supervisory signals from a particular one of said data terminals for transmitting an interrupt signal to said processor indicating that said particular data terminal wishes to transmit information signals and wherein said processor includes means responsive to said interrupt signal for transmitting to said port a particular address of said buffer memory for the storage of information signals received by said particular port.

9. The invention set forth in claim 8 wherein said ports include means for transmitting to said processor means a signal indicating when information signals have been stored at said particular address in said buffer memory and wherein said processor includes a random access memory for storing the identification of said ports designated for a particular conference and means for ordering each said port designated in said random access memory to transmit to its associated terminal, the contents of said particular address of said buffer memory.

* * * * *